US011208152B2

(12) United States Patent
Kawase (10) Patent No.: US 11,208,152 B2
(45) Date of Patent: Dec. 28, 2021

(54) VEHICLE BODY SIDE SECTION STRUCTURE

(71) Applicant: Toyota Jidosha Kabushiki Kaisha, Toyota (JP)

(72) Inventor: Kyosuke Kawase, Okazaki (JP)

(73) Assignee: TOYOTA JIDOSHA KABUSHIKI KAISHA, Toyota Aichi-ken (JP)

(*) Notice: Subject to any disclaimer, the term of this patent is extended or adjusted under 35 U.S.C. 154(b) by 139 days.

(21) Appl. No.: 16/508,708

(22) Filed: Jul. 11, 2019

(65) Prior Publication Data
US 2020/0023905 A1    Jan. 23, 2020

(30) Foreign Application Priority Data

Jul. 19, 2018 (JP) .............................. JP2018-135927

(51) Int. Cl.
| | |
|---|---|
| *B62D 25/02* | (2006.01) |
| *B62D 21/15* | (2006.01) |
| *B60L 50/64* | (2019.01) |
| *B62D 25/20* | (2006.01) |
| *B60L 50/60* | (2019.01) |

(52) U.S. Cl.
CPC ............ *B62D 25/025* (2013.01); *B60L 50/64* (2019.02); *B62D 21/157* (2013.01); *B62D 25/2036* (2013.01); *B60L 50/66* (2019.02)

(58) Field of Classification Search
CPC ......... B60K 1/04; B60L 50/66; B62D 21/157; B62D 25/025; B62D 25/20; B62D 25/2036

USPC .............................. 296/187.08, 187.12, 209
See application file for complete search history.

(56) References Cited

U.S. PATENT DOCUMENTS

| | | | |
|---|---|---|---|
| 8,696,051 B2 * | 4/2014 | Charbonneau ..... | B62D 25/2036 296/209 |
| 8,939,246 B2 * | 1/2015 | Yamaguchi ............ | B60L 50/66 180/68.5 |
| 2011/0174556 A1 * | 7/2011 | Hermann ................ | B60L 50/66 180/65.1 |
| 2013/0088044 A1 | 4/2013 | Charbonneau et al. | |
| 2013/0229030 A1 | 9/2013 | Yamaguchi et al. | |
| 2016/0257187 A1 | 9/2016 | Nakajima | |
| 2017/0217498 A1 * | 8/2017 | Akhlaque-e-rasul .... | B60K 1/04 |
| 2017/0305248 A1 | 10/2017 | Hara et al. | |
| 2018/0126933 A1 | 5/2018 | Kawase et al. | |
| 2018/0194211 A1 | 7/2018 | Hamilton et al. | |
| 2018/0215245 A1 * | 8/2018 | Sudhindra ................ | B60K 1/04 |
| 2018/0312199 A1 | 11/2018 | Kawase | |
| 2018/0312200 A1 | 11/2018 | Kawase et al. | |
| 2018/0370570 A1 | 12/2018 | Ayukawa | |
| 2018/0370577 A1 * | 12/2018 | Takahashi ................ | B60K 1/04 |

(Continued)

FOREIGN PATENT DOCUMENTS

| | | |
|---|---|---|
| CN | 105936303 A | 9/2016 |
| CN | 109094663 A | 12/2018 |

(Continued)

*Primary Examiner* — Jason S Daniels
(74) *Attorney, Agent, or Firm* — Dinsmore & Shohl LLP (57) ABSTRACT

Floor cross members provided above a floor panel are disposed so as to form a gap between each of the floor cross members and rockers. A floor cross extension that is set with a lower withstand strength than the floor cross members connects between each of the floor cross members and the corresponding rocker.

14 Claims, 4 Drawing Sheets

(56) References Cited

U.S. PATENT DOCUMENTS

| | | | |
|---|---|---|---|
| 2019/0009662 A1 | 1/2019 | Toyota | |
| 2019/0031241 A1 | 1/2019 | Ayukawa | |
| 2019/0382051 A1* | 12/2019 | Toyota | ................... B60J 5/06 |

FOREIGN PATENT DOCUMENTS

| JP | 2017087806 A | 5/2017 |
|---|---|---|
| JP | 2017-193287 A | 10/2017 |
| JP | 2017226353 A | 12/2017 |
| JP | 2018075939 A | 5/2018 |
| JP | 2018187986 A | 11/2018 |
| JP | 2018188124 A | 11/2018 |
| JP | 2019006303 A | 1/2019 |
| JP | 2019014349 A | 1/2019 |
| JP | 2019025935 A | 2/2019 |

\* cited by examiner

VEHICLE BODY SIDE SECTION STRUCTURE

CROSS-REFERENCE TO RELATED APPLICATION

This application is based on and claims priority under 35 USC 119 from Japanese Patent Application No. 2018-135927 filed on Jul. 19, 2018, the disclosure of which is incorporated by reference herein.

BACKGROUND

Technical Field

The present disclosure relates to a vehicle body side section structure.

Related Art

Japanese Patent Application Laid-Open (JP-A) No. 2017-226353, for example, discloses technology in which an energy absorbing member (hereafter referred to as "EA member") is provided inside a rocker of a vehicle body (a vehicle) in which a battery unit (hereafter referred to as "battery pack") is mounted at the lower side of a floor panel. The battery pack is protected by the EA member in a side collision of the vehicle (hereafter referred to as "vehicle side collision"). Note that, for example, United States Patent (USP) Nos 2013/0088044 and 2011/0174556, and JP-A Nos. 2017-087806 and 2018-075939 also disclose technology relating, to measures to protect a battery pack in a vehicle side collision.

In vehicles in which a battery pack is mounted at the lower side of a floor panel, the battery pack is required not to deform even in side collisions such as a side collision with a pole. However, research is underway to increase the width direction dimension of battery packs in a vehicle width direction (hereafter simply referred to as "battery pack width dimension") in order to increase the battery mounting capacity.

Increasing the battery pack width dimension results in a commensurate decrease in the distance between the battery pack and rockers disposed at the vehicle width direction outer sides of the battery pack. The amount of impact energy absorbed in a vehicle side collision can be found by multiplying impact load by deformation stroke. Thus, if the distance between the battery pack and the rockers is reduced (resulting in what is referred to as a short stroke), there is a commensurate increase in the impact load for the same impact energy absorption amount. The need therefore arises to raise the withstand strength of the battery pack in order to withstand higher loads.

SUMMARY

The present disclosure obtains a vehicle body side section structure capable of at least maintaining impact energy absorption efficiency (hereafter referred to as "EA efficiency") in a vehicle side collision without raising the withstand strength of a battery pack, even when there is a short stroke.

A vehicle body side section structure according to a first aspect includes a rocker that is installed at a vehicle width direction outer side of a floor panel of a vehicle and that extends along a vehicle front-rear direction, a floor cross member that is installed along a vehicle width direction above the floor panel so as so to form a gap between, the floor cross member and the rocker, and that has a length direction along the vehicle width direction, a battery pack that is installed at a vehicle lower side of the floor panel so as to be further toward an inner side than two length direction ends of the floor cross member in plan view, and a floor cross extension that connects the rocker and the floor cross member together in the vehicle width direction, and that is set so as to undergo plastic deformation prior to the floor cross member in a side collision of the vehicle.

In the vehicle body side section structure according to the first aspect, the rocker extends along the vehicle front-rear direction at the vehicle width direction outer side of the floor panel of the vehicle, and the floor cross member is installed along the vehicle width direction above the floor panel so as so to form a gap between the floor cross member and the rocker. The floor cross extension that is set so as to undergo plastic deformation prior to the floor cross member in a vehicle side collision connects the floor cross member and the rocker together in the vehicle width direction.

Note that the floor cross extension being set so as to undergo plastic deformation prior to the floor cross member in a vehicle side collision signifies, for example, that the floor cross extension is formed of a material with a lower withstand strength than the floor cross member. Namely, the floor cross extension undergoes plastic deformation under a lower load than the floor cross member. The battery pack is installed at the vehicle lower side of the floor panel so as to be further toward the inner side than the two length direction (vehicle width direction) ends of the floor cross member in plan view.

In the present disclosure with the above configuration, when an impact load is input to the rocker and the rocker intrudes toward the vehicle width direction inner side in a vehicle side collision, the floor cross extension is capable of undergoing plastic deformation. Some of the impact energy is absorbed by the plastic deformation of the floor cross extension. Namely, in the present disclosure, the floor cross extension is provided as a separate body, and the floor cross extension is utilized as an energy absorbing member.

In the present disclosure, the floor cross member is installed above the floor panel, and the battery pack is installed at the vehicle lower side of the floor panel. Thus, in vehicle side view, the rocker, the floor cross member, and the floor cross extension overlap with each, other at an upper section side of the rocker, and the rocker and the battery pack overlap with each other at a lower section side of the rocker.

As described above, in the present disclosure, some impact energy can be absorbed by the plastic deformation of the floor cross extension in a vehicle side collision. Namely, in the present disclosure, the amount of impact energy absorbed at the upper section side of the rocker can be increased compared to cases in which the present disclosure is not applied due to the plastic deformation of the floor cross extension.

In other words, in the present disclosure, the load borne at the upper section side of the rocker in a vehicle side collision can be raised compared to cases in which the present disclosure is not applied. This enables a relative reduction in the load borne at the lower section side, thereby enabling EA efficiency to be maintained in a vehicle side collision without raising the withstand strength of the battery pack, even when there is a short stroke.

A vehicle body side section structure according to a second aspect is the vehicle body side section structure according to the first aspect, wherein reinforcement that reinforces the battery pack is provided at the vehicle width direction outer side of the battery pack at a position overlapping with the rocker in vehicle side view.

In the vehicle body side section structure according to the second aspect, the reinforcement is provided at the vehicle width direction outer side of the battery pack at a position overlapping with the rocker in vehicle side view, and the reinforcement reinforces the battery pack. This enables the withstand strength of the battery pack as a whole, when considered to include the reinforcement, to be raised without raising the inherent withstand strength of the battery pack.

A vehicle body side section structure according to a third aspect is the vehicle body side section structure according to the first aspect, wherein a yielding portion that is bent toward a vehicle vertical direction is formed at the floor cross extension at a rocker side within the gap.

In the vehicle body side section structure according to the third aspect, the yielding portion that is bent toward the vehicle vertical direction is formed at the floor cross extension, and the yielding portion acts as the origin of the plastic deformation of the floor cross extension.

The yielding portion is formed at the rocker side within the gap, such that when impact load is input to the rocker and the rocker intrudes toward the vehicle width direction inner side in a vehicle side collision, the floor cross extension undergoes plastic deformation from the rocker side, enabling the floor cross extension to be made to undergo plastic deformation effectively.

A vehicle body side section structure according to a fourth aspect is the vehicle body side section structure according to the first aspect, wherein the floor cross member includes an upper face portion that configures an upper portion of the floor cross member and that is formed with a planar shape along a horizontal direction, and the floor cross extension includes a join portion that configures one vehicle width direction end portion of the floor cross extension, that is formed with a planar shape along the horizontal direction, and that is joined to the upper face portion of the floor cross member.

In the vehicle body side section structure according to the fourth aspect, the upper portion of the floor cross member includes the upper face portion that is formed with a planar shape along the horizontal direction. The one vehicle width direction end portion of the floor cross extension includes the join portion that is formed with a planar shape along the horizontal direction and that is joined to the upper face portion of the floor cross member.

Forming both the upper face portion of the floor cross member and the join portion of the floor cross extension that is joined to the upper face portion with planar shapes along the horizontal direction in this manner enables any effect on leg room inside a vehicle cabin to be suppressed. Note that here, "joining" includes adhesion using an adhesive, as well as joining by welding or the like.

A vehicle body side section structure according to a fifth aspect is the vehicle body side section structure according to the first aspect, wherein the rocker includes an outer section that is positioned at the vehicle width direction outer side, an inner section that is positioned at a vehicle width direction inner side of the outer section and that forms a closed cross-section together with the outer section, and a first energy absorbing section that spans in the vehicle width direction between the outer section and the inner section inside the closed cross-section. A reinforcing portion that configures part of reinforcement to reinforce the battery pack is provided between the battery pack and the rocker at a position overlapping with the first energy absorbing section in vehicle side view.

In the vehicle body side section structure according to the fifth aspect, the rocker includes the outer section that is positioned, at the vehicle width direction outer side, and the inner section that is positioned at the vehicle width direction inner side, and the outer section and the inner section form a closed cross-section. The first energy absorbing section spans in the vehicle width direction between the outer section and the inner section inside the closed cross-section. The reinforcement that reinforces the battery pack is provided between the battery pack and the rocker, and the reinforcing portion configuring part of the reinforcement is provided at a position overlapping with the first energy absorbing section in vehicle side view.

In the above configuration, when the rocker intrudes toward the vehicle width direction inner side in a vehicle side collision, the rocker receives reaction force from the reinforcing portion of the reinforcement, enabling the first energy absorbing section of the rocker to be reliably made to undergo plastic deformation.

A vehicle body side section structure according to a sixth aspect is the vehicle body side section structure according to the first aspect, wherein a rocker lower section configuring a lower section of the rocker is set so as to have a greater width dimension along the vehicle width direction than a rocker upper section configuring an upper section of the rocker.

In the vehicle body side section structure according to the sixth aspect, the rocker lower section of the rocker is set so as to have a greater width dimension along the vehicle width direction than the rocker upper section. Namely, the cross-section area of the rocker lower section of the rocker when sectioned along the vehicle vertical direction and vehicle width direction can be set larger than the cross-section area of the rocker upper section of the rocker, enabling the rigidity of the rocker lower section to be made greater than the rigidity of the rocker upper section.

Thus, the proportionate burden of an impact load input to the rocker in a vehicle side collision can be made greater at the rocker lower section side than at the rocker upper section side, such that the proportion of the impact load transmitted to the rocker upper section side as a transmission load can be set lower than the proportion of the impact load transmitted to the rocker lower section side as a transmission load.

A vehicle body side section structure according to a seventh aspect is the vehicle body side section structure according to the fifth aspect, wherein a second energy absorbing section is provided inside a rocker upper section configuring an upper section of the rocker so as to span in the vehicle width direction between the outer section and the inner section at a position overlapping with the floor cross member in vehicle side view.

In the vehicle body side section structure according to the seventh aspect, the second energy absorbing section is provided inside the rocker upper section configuring the upper section of the rocker. The second energy absorbing section spans in the vehicle width direction between the outer section and the inner section of the rocker, and is disposed at a position overlapping with the floor cross member in vehicle side view.

Thus, when the rocker intrudes toward the vehicle width direction inner side in a vehicle side collision, the rocker receives reaction force from the floor cross member, enabling the second energy absorbing section provided inside the rocker upper section to be made to reliably undergo plastic deformation.

Note that this enables a first load transmission path for transmission toward the battery pack through the first energy absorbing section of the rocker, and a second load transmission path for transmission toward the floor cross member through the second energy absorbing section of the rocker, to be formed in a vehicle side collision. Namely, an impact load input to the rocker can be distributed between the first load transmission path and the second load transmission path.

A vehicle body side section structure according to an eighth aspect, is the vehicle body side section structure according to the first aspect, wherein the rocker includes an outer section that is positioned at the vehicle width direction outer side, an inner section that is positioned at a vehicle width direction inner side of the outer section and that forms a closed cross-section together with the outer section, and a first energy absorbing section that spans in the vehicle width direction between the outer section and the inner section inside the closed cross-section. A reinforcing portion that configures part of reinforcement to reinforce the battery pack is provided between the battery pack and the rocker at a position overlapping with the first energy absorbing section in vehicle side view. The first energy absorbing section includes a first upper wall portion that extends substantially along a horizontal direction, a first lower wall portion that faces the first upper wall portion and that extends substantially along the horizontal direction, and plural first coupling walls that span in a vehicle vertical direction between the first upper wall portion and the first lower wall portion and that are arranged along the vehicle width direction.

In the above configuration, when the rocker intrudes toward the vehicle width direction inner side in a vehicle side collision, the rocker receives reaction force from the reinforcing portion of the reinforcement, enabling the plural first coupling walls arranged along the vehicle width direction in the first energy absorbing section to be reliably made to undergo plastic deformation one after another.

A vehicle body side section structure according to a ninth aspect is the vehicle body side section structure according to the eighth aspect, wherein a second energy absorbing section is disposed inside a rocker upper section configuring an upper section of the rocker so as to span in the vehicle width direction between the outer section and the inner section at a position overlapping with the floor cross member in vehicle side view. The second energy absorbing section includes a second upper wall portion that extends substantially along the horizontal direction, a second lower wall portion that faces the second upper wall portion and that extends substantially along the horizontal direction, and plural second coupling walls that span in the vehicle vertical direction between the second upper wall portion and the second lower wall portion and that are arranged along the vehicle width direction.

In the above configuration, when the rocker intrudes toward the vehicle width direction inner side in a vehicle side collision, the rocker receives reaction force from the reinforcing portion of the reinforcement, enabling the plural second coupling walls arranged along the vehicle width direction in the second energy absorbing section to be reliably made to undergo plastic deformation one after another, while sharing the load with the first energy absorbing section.

A vehicle body side section structure according to a tenth aspect is the vehicle body side section structure according to the ninth aspect, wherein a plate thickness of each of the plural second coupling walls of the second energy absorbing section is set thicker than a plate thickness each of the plural first coupling walls of the first energy absorbing section.

In the above configuration, the rigidity of the plural second coupling walls of the second energy absorbing section can be made higher than that of the plural first coupling walls of the first energy absorbing section, such that an excessive difference does not arise between the load borne by the rocker upper section and the load borne by the rocker lower section in a vehicle side collision, even if the rocker upper section has a smaller width dimension along the vehicle width direction.

A vehicle body side section structure according, to an eleventh aspect is the vehicle body side section structure according to the first aspect, wherein the battery pack includes a battery case formed in a box shape having a length direction along the vehicle front-rear direction and being flattened in a vehicle vertical direction, plural battery modules housed in an inner section of the battery case, and a tray that supports the battery case from the vehicle lower side. The tray includes a linking flange that juts out toward the rocker and that is linked to the rocker.

In the above configuration, vehicle vertical direction movement of the rocker is suppressed in a vehicle side collision, thereby enabling the rocker to be made to move in substantially the horizontal direction.

A vehicle body side section structure according to a twelfth aspect is the vehicle body side section structure according to the eleventh aspect, wherein reinforcement that reinforces the battery pack is provided at the vehicle width direction outer side of the battery pack at a position overlapping with the rocker in vehicle side view, and the reinforcement includes a joining tab that extends from a lower end of the reinforcement toward a lower side and that is joined to the tray.

In the above configuration, vehicle vertical direction, movement of the rocker relative to the reinforcement is suppressed in a vehicle side collision, thereby enabling the rocker to be made to move in substantially the horizontal direction.

As explained above, the vehicle body side section structure according to the first aspect has an effect of enabling, at least EA efficiency to be maintained in a vehicle side collision without raising the withstand strength of the battery pack, even when there is a short stroke.

The vehicle body side section structure according to the second aspect has an effect of enabling the withstand strength of the battery pack as a whole, when considered to include the reinforcement, to be raised without raising the inherent withstand strength of the battery pack.

The vehicle body side section structure according to the third aspect has an effect of enabling the floor cross extension to undergo plastic deformation from the rocker side so as to suppress incomplete crushing when the rocker intrudes toward the vehicle width direction inner side in a vehicle side collision.

The vehicle body side section structure according to the fourth aspect has an effect of enabling any effect on leg room inside the vehicle cabin to be suppressed.

The vehicle body side section structure according to the fifth aspect has an effect of enabling the rocker to receive reaction force from the reinforcing portion of the reinforcement when the rocker intrudes toward the vehicle width direction inner side in a vehicle side collision, enabling the first energy absorbing section of the rocker to be reliably made to undergo plastic deformation, and thus enabling EA efficiency to be improved.

The vehicle body side section structure according to the sixth aspect has an effect of enabling the rigidity of the rocker lower section to be made greater than the rigidity of the rocker upper section.

The vehicle body side section structure according to the seventh aspect has an effect of enabling the rocker to receive reaction force from the floor cross member when the rocker intrudes toward the vehicle width direction inner side in a vehicle side collision, enabling the second energy absorbing section provided inside the rocker upper section to be reliably made to undergo plastic deformation, and thus enabling EA efficiency to be improved.

The vehicle body side section structure according to the eighth aspect has an effect of enabling the rocker to receive reaction force from the reinforcing portion of the reinforcement when the rocker intrudes toward the vehicle width direction inner side in a vehicle side collision, enabling the plural first coupling walls arranged along the vehicle width direction in the first energy absorbing section to be made to undergo plastic deformation one after another, and thus enabling EA efficiency to be improved.

The vehicle body side section structure according to the ninth aspect has an effect of enabling the rocker to receive reaction force from the reinforcing portion of the reinforcement when the rocker intrudes toward the vehicle width direction inner side in a vehicle side collision, enabling the plural second coupling waits arranged along the vehicle width direction in the second energy absorbing section to be made to undergo plastic deformation one after another while sharing load with the first energy absorbing section, thus enabling EA efficiency to be improved.

The vehicle body side section structure according to the tenth aspect has an effect of enabling the load borne by the upper section side and the lower section side of the rocker to be finely adjusted, such that an excessive difference does not arise between the load borne by the rocker upper section and the load borne by the rocker lower section due to the rigidity of the rocker lower section, even if the rocker upper section has a smaller width dimension along the vehicle width direction, and also of enabling the rigidity of the rocker lower section to be made greater than the rigidity of the rocker upper section.

The vehicle body side section structure according to the eleventh aspect has an effect of enabling vehicle vertical direction movement of the rocker to suppressed in a vehicle side collision, thereby enabling the rocker to be made to move in substantially the horizontal direction. This enables the rocker to be made to undergo plastic deformation in a stable manner, and thus enables EA efficiency to be maintained.

The vehicle body side section structure according to the twelfth aspect has an effect of enabling vehicle vertical direction movement of the rocker relative to the reinforcement to be suppressed in a vehicle side collision, thereby enabling the rocker to be made to move in substantially the horizontal direction. This enables the rocker to be made to undergo plastic deformation in as table manner, and thus enables EA efficiency to be maintained.

BRIEF DESCRIPTION OF THE DRAWINGS

Exemplary embodiments will be described in detail based on the following figures, wherein.

DETAILED DESCRIPTION

Explanation follows regarding an electric vehicle (hereafter simply referred to as "vehicle") applied with a vehicle body side section structure according to an exemplary embodiment of the present disclosure, with reference to the drawings. Note that in each of the drawings, the arrow FR, the arrow UP, and the arrow RH respectively indicate a forward direction (a direction of progress), an upward direction, and a right direction of the vehicle, as appropriate. Unless specifically stated otherwise, simple reference to front and rear, left and right, and up and down directions refers to front and rear in the vehicle front-rear direction, left and right in the vehicle left-right direction (vehicle width direction), and up and down in the vehicle vertical direction. The respective drawings may omit some reference numerals in order to facilitate viewing of the drawings.

Configuration of Vehicle Body Side Section Structure

Explanation first follows regarding configuration of the vehicle body side section structure according to the present exemplary embodiment.

Figure 1:
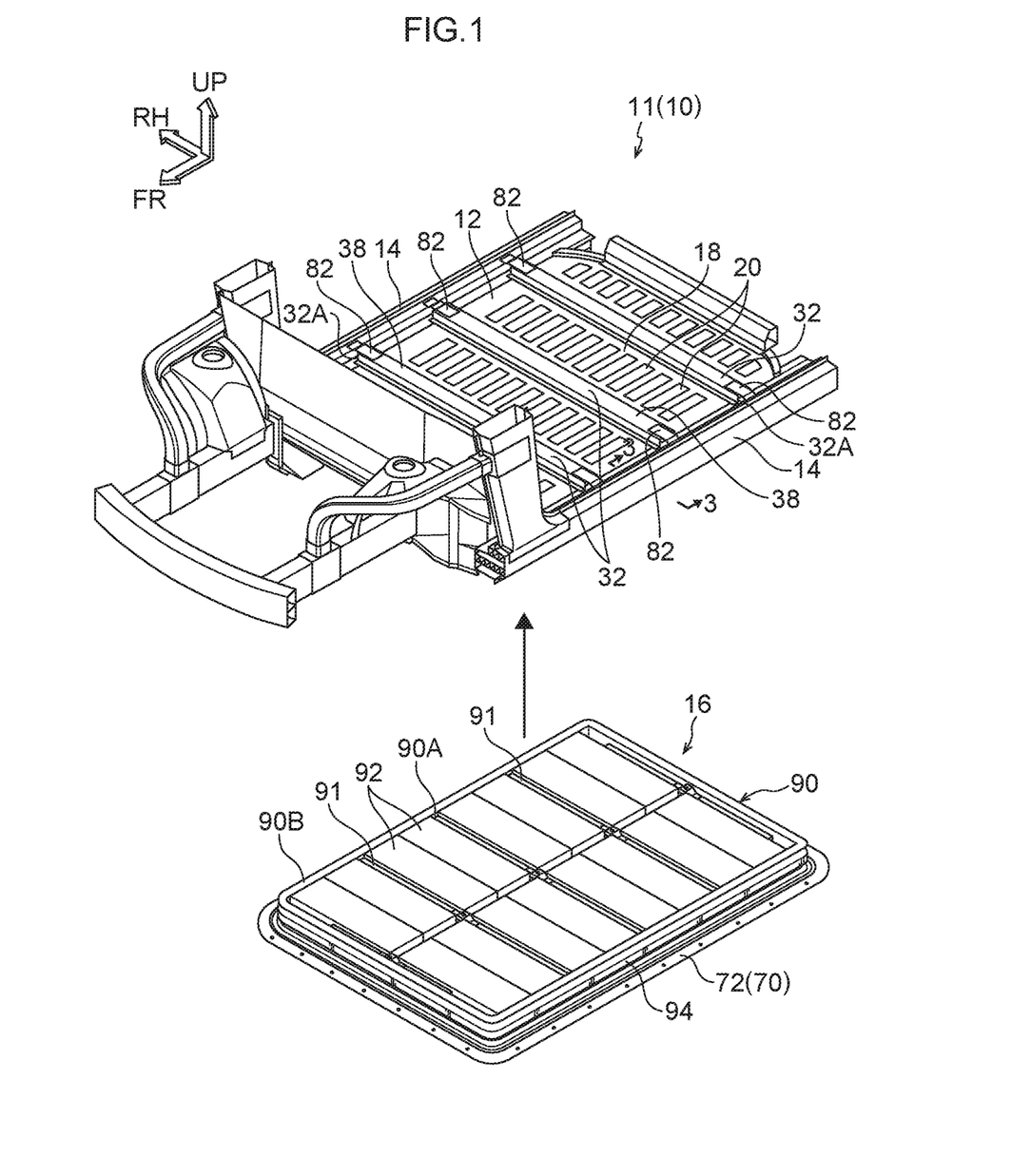
FIG. 1 is an exploded perspective view illustrating a vehicle lower section and a battery pack applied with a vehicle body side section structure according to an exemplary embodiment.
Figure 2:
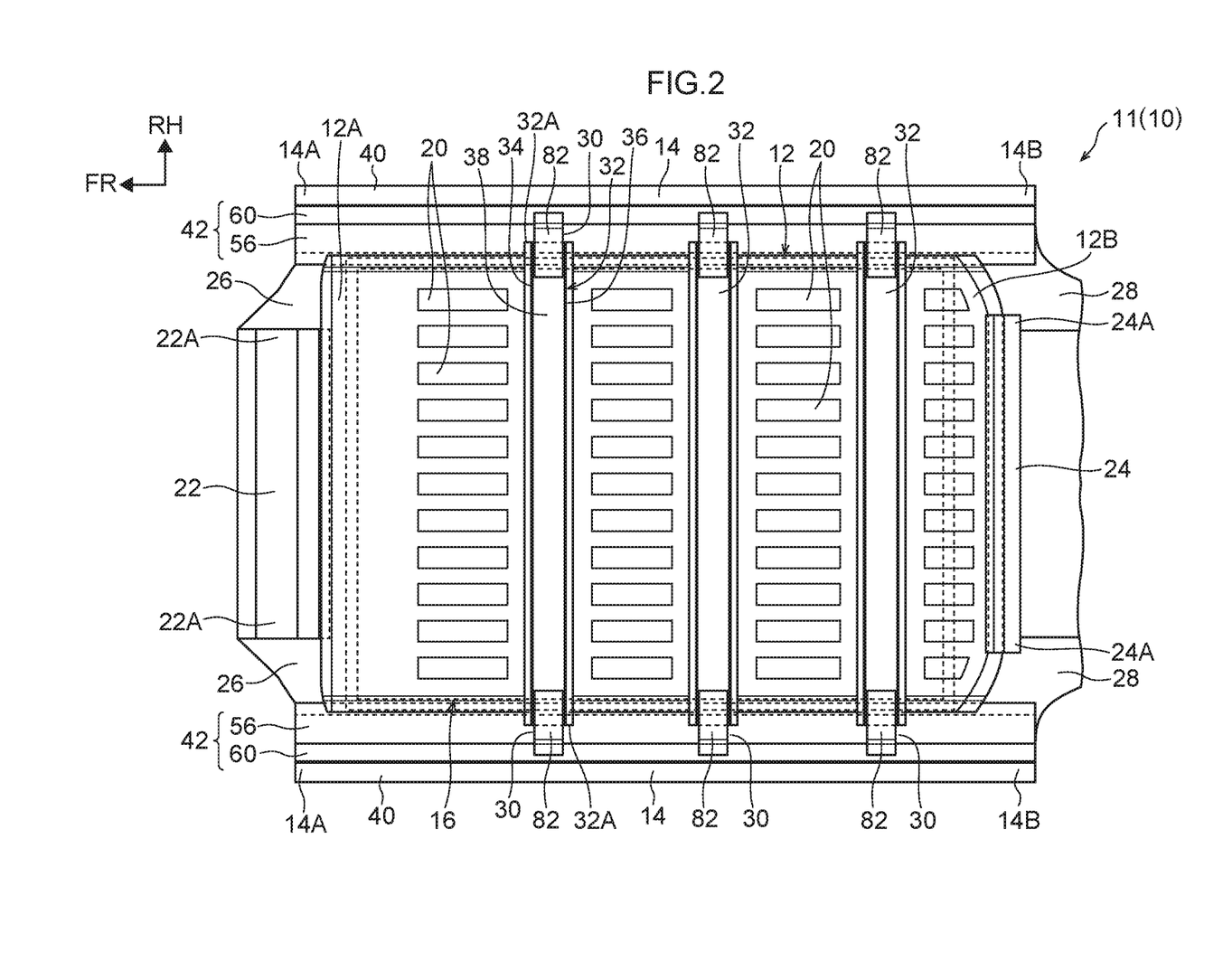
FIG. 2 is a plan view of a vehicle lower section applied with a vehicle body side section structure according to the present exemplary embodiment.

FIG. 1 is an exploded perspective view illustrating configuration of a lower section (a vehicle lower section 11) of a vehicle body (vehicle) 10 applied with the vehicle body side section structure according to the present exemplary embodiment. FIG. 2 is a plan view of the vehicle lower section 11. As illustrated in FIG. 1 and FIG. 2, the vehicle 10 includes a floor panel 12, rockers 14, and a battery pack 16, which are explained in sequence below.

Configuration of Floor Panel

As illustrated in FIG. 1 and FIG. 2, the floor panel 12 configuring a floor section, of a vehicle cabin 18 of the vehicle 10 extends along the vehicle width direction, and vehicle front-rear direction. Bead portions 20, each formed with a substantially, rectangular shape in plan view, project from the floor panel 12 intermittently along the vehicle front-rear direction. Plural of the bead portions 20 are arrayed across the vehicle width direction. Forming the bead portions 20 raises the inherent rigidity of the floor panel 12.

The respective rockers 14 extend along the vehicle front-rear direction on both, vehicle width direction outer sides of the floor panel 12. A front cross member 22 extends along the vehicle width direction at a front end portion 12A of the floor panel 12, and a rear cross member 24 extends along the vehicle width direction at a rear end portion 12B of the floor panel 12.

Coupling members 26 are respectively coupled to two end portions 22A of the front cross member 22. The front cross member 22 is coupled to front end portions 14A of the respective rockers 14 through the coupling members 26. Coupling members 28 are respectively coupled to two end portions 24A of the rear cross member 24. The rear cross member 24 is coupled to rear end portions 14B of the respective rockers 14 through the coupling members 28.

Note that the coupling members 26, 28 are not an absolute requirement. Obviously the front cross member 22 and the rear cross member 24 may be formed such that the two end portions 22A of the front cross member 22 and the two end portions 24A of the rear cross member 24 are directly coupled to the respective rockers 14.

Figure 3:
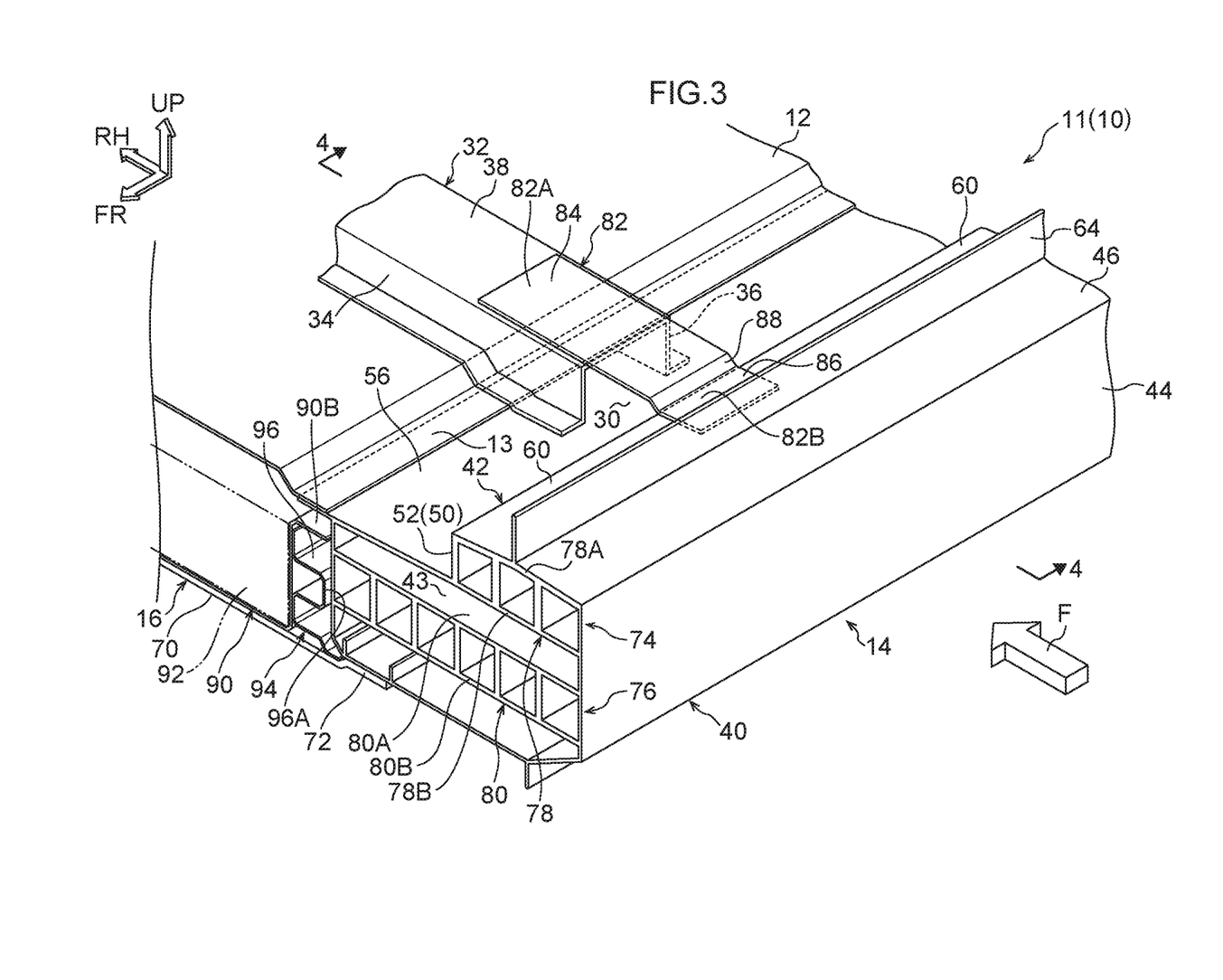
FIG. 3 is a perspective view illustrating a state sectioned along line 3-3 in FIG. 1 viewed obliquely from the upper-front at a vehicle outer side.

As illustrated in FIG. 2 and FIG. 3, floor cross members 32 are installed along the vehicle width direction above the floor panel 12 in a state in which gaps 30 are provided between the floor cross members 32 and the respective rockers 14. Note that FIG. 3 is a perspective view illustrating a state sectioned along line 3-3 in FIG. 1 as viewed obliquely from the upper-front at a vehicle outer side.

As illustrated in FIG. 2 and FIG. 3, each of the floor cross members 32 has a hat shaped profile opening toward the floor panel 12 as sectioned along the vehicle vertical direction and vehicle front-rear direction. To explain specifically, each of the floor cross members 32 includes a front wall portion 34 disposed on the front side and a rear wall portion 36 disposed on the rear side so as to face each other in the vehicle front-rear direction, and an upper face portion 38 that connects together upper ends of the front wall portion 34 and the rear wall portion 36. Note that plural of the floor cross members 32 are disposed at predetermined spacings between the front cross member 22 and the rear cross member 24, and that the bead portions 20 are formed in advance so as to avoid interference with the floor cross members 32.

Configuration of Rockers

Figure 4:
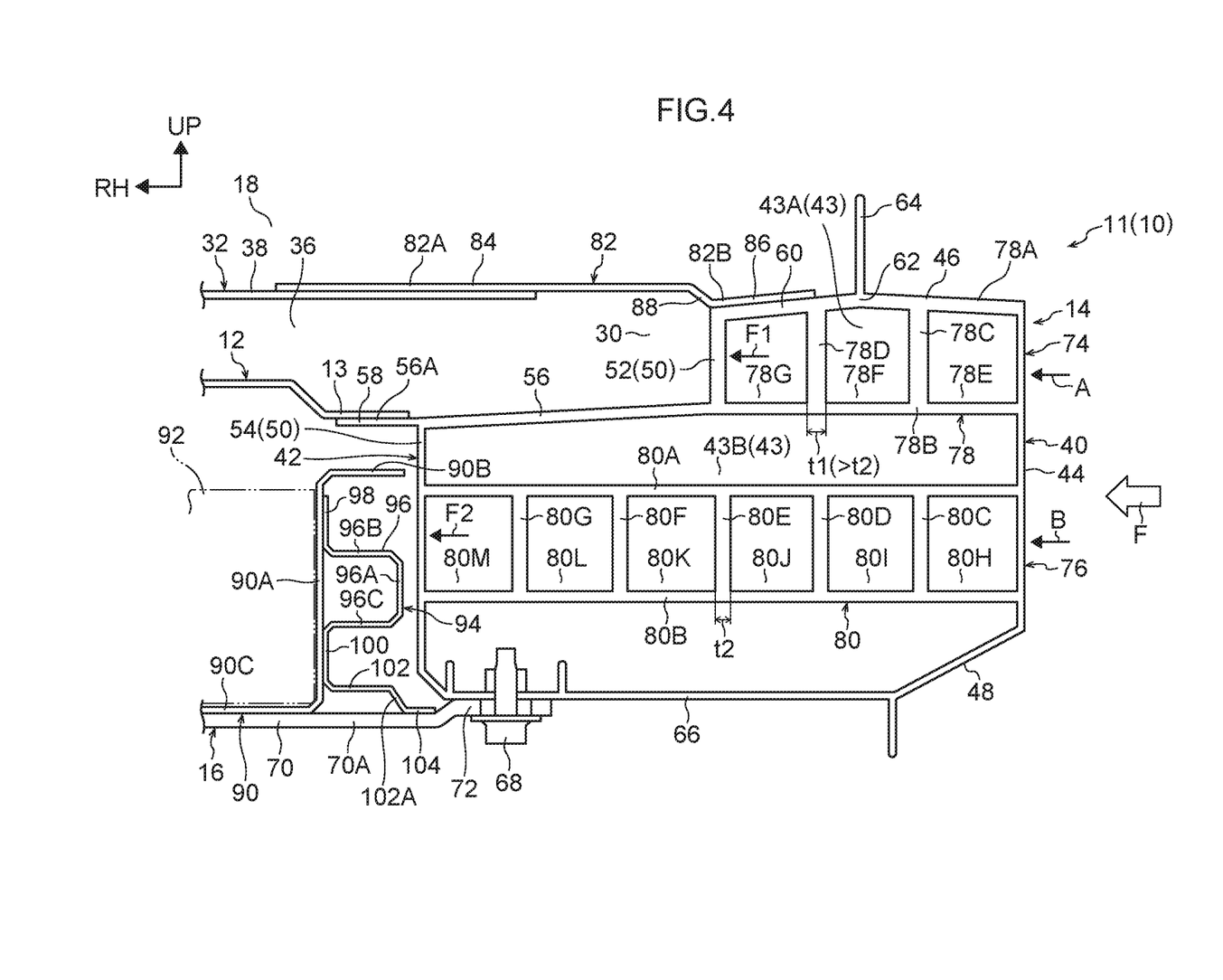
FIG. 4 is a cross-section sectioned along line 4-4 in FIG. 3.

FIG. 4 is a cross-section sectioned along line 44 in FIG. 3. As illustrated in FIG. 4, each of the rockers 14 includes an outer section 40 positioned on the vehicle width direction outer side and an inner section 42 positioned on the vehicle width direction inner side. The rockers 14 are formed of a metal such as an aluminum alloy. The outer section 40 and the inner section 42 are integrally formed by extrusion, drawing, or the like, and the outer section 40 and the inner section 42 form a closed cross-section 43.

In cross-section, profile sectioned along the vehicle width direction, the outer section 40 includes an outer wall portion 44 formed along the vertical direction. A sloped upper wall portion 46 that slopes slightly toward the upper side progression toward the vehicle width direction inner side is provided at the upper side of the outer wall portion 44. A sloped lower wall portion 48 that slopes toward the lower side progression toward the vehicle width direction inner side is provided at the lower side of the outer wall, portion 44.

In cross-section profile sectioned along the vehicle width direction, the inner section 42 includes an inner wall portion 50 formed along the vertical direction. The inner wall portion 50 includes an upper inner wall portion 52 formed at an upper portion of the inner section 42, and a lower inner wall portion 54 formed at a lower portion of the in section 42.

The lower inner wall portion 54 is positioned further toward the vehicle width direction inner side than the upper inner wall portion 52. A lateral wall portion 56 that slopes slightly toward the lower side progression toward the vehicle width direction inner side is provided between the lower inner wall portion 54 and the upper inner wall portion 52. A flange portion 58 that extends further toward the vehicle width direction inner side than the lower inner wall portion 54 and is formed substantially along a horizontal direction is provided to a leading end portion 56A of the lateral wall portion 56. An outer edge 13 of the floor panel 12 is joined to the flange portion 58. Note that in the present exemplary embodiment, "joining" includes adhesion using an adhesive, as well as joining by welding or the like.

A sloped upper wall portion 60 that slopes toward the upper side progression toward the vehicle width direction outer side is provided at the upper side of the upper inner wall portion 52. The sloped upper wall portion 60 is formed so as to be connected to the sloped upper wall portion 46 of the outer section 40. A flange portion 64 extends toward the upper side from an apex portion 62 where the sloped upper wall portion 60 of the inner section 42 and the sloped upper wall portion 46 of the outer section 40 are connected together. Note that a lower end portion of a pillar, not illustrated in the drawings, is linked to the flange portion 64.

A lower face portion 66 formed substantially along the horizontal direction toward the vehicle width direction outer side is provided at the lower side of the lower inner wall portion 54. The lower face portion 66 is formed so as to be connected to the sloped lower wall portion 48 of the outer section 40. Note that a fastener 68 is capable of being inserted through the lower face portion 66. A linking flange 72 provided to a tray 70 that supports the battery pack 16, described later, is capable of being fastened to the rocker 14 using the fastener 68.

The lateral wall portion 56 provided between the lower inner wall portion 54 and the upper inner wall portion 52 extends as far as the outer wall portion 44 of the outer section 40, such that the rocker 14 is divided into a rocker upper section 74 and a rocker lower section 76 by the lateral wall portion 56. The closed cross-section 43 configuring an inner section of the rocker 14 is thereby partitioned into an upper closed cross-section 43A on the rocker upper section 74 side and a lower closed cross-section 43B on the rocker lower section 76 side.

As described above, the upper inner wall portion 52 of the inner section 42 is positioned further toward the vehicle width direction outer side than the lower inner wall portion 54. Thus, the cross-section areas of the rocker upper section 74 and the rocker lower section 76 of the respective rocker 14 are different from each other. In the present exemplary embodiment, the cross-section area on the rocker lower section 76 side is set so as to be larger than the cross-section area on the rocker upper section 74 side.

A ladder shaped upper-side energy absorbing section (a second energy absorbing section) 78 configuring a closed cross-section structure is formed inside the rocker upper section 74 (the upper closed cross-section 43A). A ladder shaped lower-side energy absorbing section (a first energy absorbing section) 80 configuring a closed cross-section structure is formed inside the rocker lower section 76 (the lower closed cross-section 43B). The lower-side energy absorbing section 80 has a longer vehicle width direction dimension than the upper-side energy absorbing section 78.

Note that the upper-side energy absorbing section 78 is provided so as to overlap with the floor cross members 32 in vehicle side view. In the upper-side energy absorbing section 78, a second upper wall portion 78A is configured by the sloped upper wall portion 46 of the outer section 40 and the sloped upper wall portion 60 of the inner section 42, and a second lower wall portion 78B is configured by the lateral wall portion 56. Plural (two in this case) second coupling walls 78C, 78D span in the vertical direction between the second upper wall portion 78A and the second lower wall portion 78B. The plural second coupling walls 78C, 78D are disposed at substantially uniform separations along the vehicle width direction. The plural second coupling walls 78C, 78D configure plural closed cross-sections (small compartments 78E, 78F, 78G) provided to the upper-side energy absorbing section 78.

Note that the sloped upper wall portion 60 of the inner section 42 and the sloped upper wall portion 46 of the outer section 40 slope toward the upper side progression toward the apex portion 62, and that the apex portion 62 is provided at the upper side of the small compartment 78F. The small compartment 78F therefore has a larger cross-section area than either of the small compartments 78E, 78G. Namely, the small compartment 78F has a higher rigidity than the small compartments 78E, 78G. In a vehicle side collision, the small compartment 78F is capable of suppressing deformation and transmitting some of an impact load F into the pillar (not illustrated in the drawings) linked to the flange portion 64 extending from the apex portion 62.

The lower-side energy absorbing section 80 is provided so as to overlap with the battery pack 16, described later, in vehicle side view. A first upper wall portion 80A that spans substantially in the horizontal direction between the lower inner wall portion 54 of the inner section 42 and the outer wall portion 44 of the outer section 40 is provided to the lower-side energy absorbing section 80. A first lower wall portion 80B that spans substantially in the horizontal direction between the lower inner wall portion 54 of the inner section 42 and the outer wall portion 44 of the outer section 40 is provided at the lower side of the first upper wall portion 80A so as to face the first upper wall portion 80A.

Plural (five in this case) first coupling walls 80C, 80D, 80E, 80F, 80G span in the vertical direction between the first upper wall portion 80A and the first lower wall portion 80B of the lower-side energy absorbing section 80. The plural first coupling walls 80C, 80D, 80E, 80F, 80G are disposed at substantially uniform separations along the vehicle width direction. The plural first coupling walls 80C, 80D, 80E, 80F, 80G configure plural closed cross-sections (small compartments 80H, 80I, 80J, 80K, 80L, 80M) provided to the lower-side energy absorbing section 80.

In a side collision of the vehicle 10, impact is absorbed by plastic deformation of the upper-side energy absorbing section 78 and the lower-side energy absorbing section 80. Note that the lower-side energy absorbing section 80 has a longer vehicle width direction dimension than the upper-side energy absorbing section 78. Thus, the lower-side energy absorbing section 80 has a greater number of closed cross-sections than the upper-side energy absorbing section 78, and has a commensurately higher rigidity than the upper-side energy absorbing section 78.

Note also that a plate thickness (t1) of each of the plural second coupling walls 78C, 78D on the upper-side energy absorbing section 78 side is set so as to be thicker than a plate thickness (t2) of each of the plural first coupling walls 80C, 80D, 80E, 80F, 80G on the lower-side energy absorbing section 80 side. The rigidity of the plural second coupling walls 78C, 78D is therefore commensurately higher than it would be if the plate thickness of each of the plural second coupling walls 78C, 78D were t2.

Configuration of Floor Cross Extension.

As illustrated in FIG. 3 and FIG. 4, the sloped upper wall portion 60 of the rocker upper section 74 and the upper face portions 38 the respective floor cross members 32 are connected together in the vehicle width direction through plate shaped floor cross extensions 82. Each floor cross extension 82 is formed h pressing a metal such as an aluminum alloy, for example, and is set lower in withstand strength than the floor cross members 32.

A join portion 84 formed with a planar shape along the horizontal direction is provided to one vehicle width direction end portion 82A of each floor cross extension 82. The join portion 84 is joined to the upper face portion 38 of the corresponding floor cross member 32. A join portion 86 is provided to another vehicle width direction end portion 82B of the floor cross extension 82. The join portion 86 is joined to the sloped upper wall portion 60 of the corresponding rocker upper section 74. Note that a height direction position of the join portion 86 is a lower position than that of the upper face portion 38 of the floor cross member 32. A yielding portion 88 that is bent toward the vehicle vertical direction lower side is formed on the floor cross extension 82 on the rocker upper section 74 side.

Configuration of Battery Pack

As illustrated in FIG. 2, the battery pack 16 is installed at the lower side of the floor panel 12. The battery pack 16 is disposed further toward a length direction (vehicle width direction) inner side than two ends 32A of each of the floor cross members 32 in plan view. Note that the battery pack 16 is configured by a storage battery employing a lithium-ion battery, a nickel-hydrogen battery, or the like, or a fuel cell employing hydrogen together with methanol or ethanol, serving as drive force supply device for supplying power to a power unit such as a motor.

As illustrated in FIG. 1, the battery pack 16 includes a battery case 90 that is formed in a box shape with its length direction along the vehicle front-rear direction and that is flattened in the vehicle vertical direction, and plural battery modules 92 housed inside the battery case 90. Note that the battery modules 92 are configured by plural rectangular storage batteries. Plural cross members 91 are installed inside the battery lease 90 at predetermined spacings along the vehicle front-rear direction so as to span in the vehicle width direction between peripheral walls 90A that face each other in the vehicle width direction.

As illustrated in FIG. 4, a flange portion 90B extends from an upper end of the battery case 90 toward the outer side of the battery case 90. Although not illustrated in the drawings, a lid section formed in a substantially rectangular shape to cover the battery case 90 from above is provided at the upper side of the battery case 90. The lid section is formed by press-molding a sheet material formed of a lightweight metal such as an aluminum alloy. A peripheral edge of the lid section is fixed to the flange portion 90B of the battery case 90 by plural bolts, not illustrated in the drawings.

The substantially rectangular shaped tray 70 that supports the battery case 90 from the lower side is provided at the lower side of the battery case 90. The tray 70 is formed by press-molding a sheet material formed of a lightweight metal such as an aluminum alloy. A bottom wall 90C of the battery case 90 is fixed to the tray 70 by a fixing method such as welding or riveting.

The tray 70 is formed so as to be a size that protrudes out from the peripheral walls 90A of the battery case 90 in plan view. Reinforcement 94, described later, is provided to a peripheral edge 70A of the tray 70. The peripheral walls 90A of the battery ease 90 are covered by the reinforcement 94.

The linking flanges 72 jut out substantially along the horizontal direction toward the respective rockers 14, and are provided to the tray 70 so as to be further toward the outer sides than the peripheral edge 70A of the tray 70. The linking flanges 72 are fastened (linked) to the left and right rockers 14, such that the battery case 90, namely, the battery pack 16, is fixed to the rockers 14 in a state supported from the lower side by the tray 70.

Configuration of Reinforcement

Explanation follows regarding the reinforcement 94. The reinforcement 94 is formed by extrusion-molding a lightweight metal such as an aluminum alloy into an elongated extrusion-molded component, bending the extrusion-molded component into a rectangular frame shape, and joining two length direction end portions of the extrusion-molded component together to form a rectangular frame shape in plan view. As illustrated in FIG. 4, for example, a cross-section profile of the reinforcement 94 when sectioned along a direction orthogonal to a peripheral, direction of the reinforcement 94 (the length direction of the extrusion-molded component) configures a substantially rectangular corrugated shape.

A projection portion (reinforcing portion) 96 that projects toward the respective rockers 14 is formed at a vertical direction center portion of the reinforcement 94. The projection portion 96 includes an upright wall portion 96A that is disposed facing the lower inner wall portions 54 of the rockers 14 and is formed along a vertical direction of the reinforcement 94. The upright wall portion 96A is provided at a position overlapping with (including) the first lower wall portion 80B of the lower-side energy absorbing section 80 provided inside each of the rockers 14 in vehicle side view. The first lower wall portion 80B is disposed at a substantially vertical direction central portion of the upright wall portion 96A. The projection portion 96 further includes an upper lateral wall, portion 96B and a lower lateral wall portion 96C that are respectively connected to an upper end and a lower end of the upright wall portion 96A and that are formed substantially along the horizontal direction.

A joining tab 98 extends toward the upper side from an upper end of the projection portion 96 (the upper lateral wall portion 96B side) of the reinforcement 94 so as to follow the peripheral walls 90A of the battery case 90. A joining tab 100 extends toward the lower side from a lower end of the projection portion 96 (the lower lateral wall portion 96C side) so as to follow the peripheral walls 90A of the battery case 90. The joining tabs 98, 100 are joined to the peripheral walls 90A of the battery case 90.

Part of a projection portion 102 projecting toward the respective rockers 14 is provided at a lower end of the joining tab 100. A joining tab 104 extends toward the rockers 14 from an upright wall portion 102A configuring part of the projection portion 102. The joining tab 104 is joined to the tray 70. Note that the upright wall portion 102A slopes toward the rockers 14 on progression toward the lower side.

Operation and Effects of Vehicle Body Side Section Structure

Explanation follows regarding the operation and effects of the vehicle body side section structure according to the present exemplary embodiment.

As illustrated in FIG. 4, in the present exemplary embodiment, the floor cross members 32 provided along the vehicle width direction above the floor panel 12 are installed such that the gaps 30 are created between the floor cross members 32 and the respective rockers 14. The floor cross members 32 and each of the rockers 14 are connected together in the vehicle width direction by the floor cross extensions 82 that are set so as to undergo plastic deformation prior to the floor cross members 32 in a vehicle side collision.

For example, the floor cross extensions 82 are formed of a material with a lower withstand strength than the floor cross members 32, and are set so as to undergo plastic deformation under a lower load than the floor cross members 32. In the present exemplary embodiment, as illustrated in FIG. 2, the battery pack 16 is installed, at the vehicle lower side of the floor panel 12 so as to be further toward the inner side than the two length direction ends 32A of the respective floor cross members 32 in plan view.

Due to the above configuration, in the present exemplary embodiment, when an impact load F is input to one of the rockers 14 and the rocker 14 intrudes toward the vehicle width direction inner side in a side collision of the vehicle 10 illustrated in FIG. 3 and FIG. 4, the corresponding floor cross extensions 82 are capable of undergoing plastic deformation. Some of the impact energy is absorbed by the plastic deformation of the floor cross extensions 82. Namely, in the present exemplary embodiment, the floor cross extensions 82 are provided as separate bodies, and the floor cross extensions 82 are utilized as energy absorbing members.

In the present exemplary embodiment, the floor, cross members 32 are installed above the floor panel 12, and the battery pack 16 is installed at the vehicle lower side of the floor panel 12. Thus, in the present exemplary embodiment, in vehicle side view, the rockers 14, the floor cross members 32, and the floor cross extensions 82 overlap with each other on the rocker upper section 74 side, and the rockers 14, the battery pack 16, and the reinforcement 94 overlap with each other on the rocker lower section 76 side.

As described above, in the present exemplary embodiment, some impact energy can be absorbed by plastic deformation of the floor cross extensions 82 in a side collision of the vehicle 10. Namely, in the present exemplary embodiment, the amount of impact energy absorbed on the rocker upper section 74 side can be increased by the plastic deformation of the floor cross extensions 82, and the load borne at the rocker upper section 74 side in a vehicle side collision can be increased compared to cases in which the present, exemplary embodiment is not applied.

This enables a relative reduction in the load borne on the rocker lower section 76 side, thereby enabling EA efficiency to be maintained in a side collision of the vehicle 10 without raising the withstand strength of the battery pack 16, even when there is a short stroke.

In the present exemplary embodiment, the reinforcement 94 is provided at the vehicle width direction outer sides of the battery pack 16 at a position, overlapping with the rockers 14 in vehicle side view, thereby reinforcing the battery pack 16. Namely, in the present exemplary embodiment, the withstand strength of the battery pack 16 as a whole, when considered to include the reinforcement 94, can be raised without raising the inherent withstand strength of the battery pack 16.

In the present exemplary embodiment, the yielding portion 88 that is bent toward the vehicle vertical direction is formed at each of the floor cross extensions 82, The yielding portion 88 acts as the origin of the plastic deformation of the floor cross extension 82. The yielding portion 88 is formed on the rocker 14 side, within the gap 30. Thus, when an impact load F is input to the rocker 14 and the rocker 14 intrudes to the vehicle width direction inner side in a side collision of the vehicle 10, plastic deformation of the corresponding floor cross extensions 82 occurs from the rocker 14 side. Namely, in the present exemplary embodiment, the floor cross extensions 82 can be made to undergo plastic deformation effectively, enabling incomplete, crushing to be suppressed and enabling EA efficiency to be improved.

In the present exemplary embodiment, the upper face portion 38 of each of the floor cross members 32 is formed with a planar shape along the horizontal direction. The join portion 84 that is formed at the one end portion 82A of each of the floor cross extensions 82 and joined to the upper face portion 38 of the corresponding floor cross member 32 is also formed with a planar shape along the horizontal direction.

This enables any effect on legroom inside the vehicle cabin 18 to be suppressed in the present exemplary embodiment. Thus, in the present exemplary embodiment, EA efficiency can be improved without reducing the space inside the vehicle cabin 18.

In the present exemplary embodiment, each of the rockers 14 includes the outer section 40 positioned on the vehicle width direction outer side and the inner section 42 positioned on the vehicle width direction inner side, and the closed cross-section 43 is formed by the outer section 40 and the inner section 42. The lower-side energy absorbing section 80 spans in the vehicle width direction between the outer section 40 and the inner section 42 on the rocker lower section 76 side inside the closed cross-section 43 of the rocker 14. The reinforcement 94 is provided between the battery pack 16 and the rockers 14 so as to reinforce the battery pack 16. The projection portion 96 that configures part of the reinforcement 94 is provided at a position overlapping with the lower-side energy absorbing sections 80 in vehicle side view.

Thus, in the present exemplary embodiment, when the rocker 14 intrudes toward the vehicle width direction inner side in a side collision of the vehicle 10, the rocker 14 receives reaction force from the projection portion 96 of the reinforcement 94, enabling the lower-side energy absorbing section 80 of the rocker 14 to be reliably made to undergo plastic deformation, and enabling EA efficiency to be improved.

In the present exemplary embodiment, the rocker lower section 76 of each of the rockers 14 is set so as to have a larger width dimension along the vehicle width direction than the rocker upper section 74. Namely, the cross-section area of the rocker lower section 76 when sectioned along the vehicle vertical direction and vehicle width direction can be set larger than the cross-section area of the rocker upper section 74, enabling the rigidity of the rocker lower section 76 to be made greater than the rigidity of the rocker upper section 74 of the rocker 14.

Thus, in the present exemplary embodiment, the proportionate burden of an impact load F input to the rocker 14 in a side collision of the vehicle 10 can be made greater at the rocker lower section 76 side than at the rocker upper section 74 side, such that the proportion of the impact load F transmitted to the rocker upper section 74 side as a transmission load F1 can be set lower than the proportion of the impact load F transmitted to the rocker lower section 76 side as a transmission load F2.

In the present exemplary embodiment, the upper-side energy absorbing section 78 is provided on the rocker upper section 74 side inside the closed cross-section 43 of each rocker 14. The upper-side energy absorbing section 78 spans in the vehicle width direction between the outer section 40 and the inner section 42 of the rocker 14, and is disposed in a position overlapping with the floor cross members 32 in vehicle side view.

Thus, in the present exemplary embodiment, when the rocker 14 intrudes toward the vehicle width direction inner side in a side collision of the vehicle 10, the rocker 14 receives reaction force from the floor cross members 32, enabling the upper-side energy absorbing section 78 provided inside the rocker upper section 74 to be made to reliably undergo plastic deformation and enabling EA efficiency to be improved.

In the present exemplary embodiment, the upper-side energy absorbing section 78 spans in the vehicle width direction between the outer section 40 and the inner section 42 on the rocker upper section 74 side, and the lower-side energy absorbing section 80 spans in the vehicle width direction between the outer section 40 and the inner section 42 on the rocker lower section 76 side, inside the closed cross-section 43 of the rocker 14. This enables a load transmission path A for transmission toward the floor cross members 32 through the upper-side energy absorbing section 78 of the rocker upper section 74, and a load transmission path B for transmission toward the battery pack 16 through the lower-side energy absorbing section 80 of the rocker lower section 76, to be formed in a side collision of the vehicle 10. Namely, in the present exemplary embodiment, an impact load F input to the rocker 14 can be distributed between the load transmission path A and the load transmission path B.

Thus, in the present exemplary embodiment, the proportions of impact load F borne by the rocker upper section 74 and the rocker lower section 76 can be modified. For example, reducing the transmission load F2 that is transmitted toward the battery pack 16 installed at the tower side of the floor panel 12 permits the inherent rigidity of the battery pack 16 to be lowered. In such cases, the plate thickness of the battery pack 16 can be made thinner and the battery pack 16 can be made lighter in weight. This reduction in the plate thickness of the battery pack 16 enables a commensurate increase in the mounting capacity of the battery modules 20A housed inside the battery pack 16.

Supplementary Details Regarding Present Exemplary Embodiment

Although an example has been given in the present exemplary embodiment in which the rockers 14, the reinforcement 94, and the floor cross extensions 82 are each made of an aluminum alloy, there is no particular limitation to the materials employed for these members. For example, another metal such as sheet steel or a magnesium alloy may be employed. Note that the same also applies to other members, such as the floor cross members 32.

In the present exemplary embodiment, as illustrated in FIG. 4, each of the floor cross extensions 82 connect between the sloped upper wall portion 60 on the rocker upper section 74 side and the upper face portion 38 of the corresponding floor cross member 32 in the vehicle width direction. However, there is no limitation to this configuration since it is sufficient that each floor cross extension 82 be provided within the gap 30 provided between the rocker 14 and the corresponding, floor cross member 32. For example, although not illustrated in the drawings, a floor cross extension may be provided so as to connect between the upper inner wall portion 52 on the rocker upper section 74 side and the front wall portion 34 and rear wall portion 36 of each of the floor cross members 32 in the vehicle width direction.

In the present exemplary embodiment, a cross-section profile of the reinforcement 94 when sectioned along a direction orthogonal to the peripheral direction configures a substantially rectangular corrugated shape. However, the reinforcement 94 is a member for reinforcing the battery case 90, and so its shape is not limited to that in the present exemplary embodiment. For example, although not illustrated in the drawings, reinforcement may be provided with a cross-section profile that forms a substantially B shape when sectioned along a direction orthogonal to the peripheral direction.

In the present exemplary embodiment, the yielding portion 88 that is bent toward the lower side is formed on the rocker upper section 74 side of each of the floor cross extensions 82. However, the configuration of the yielding portion 88 is not limited since it is sufficient that the yielding portion 88 act as the origin of the plastic deformation of the floor cross extension 82. For example, a notch or a hole may be formed in order to weaken the floor cross extension 82.

In the present exemplary embodiment, the upper face portion 38 of each of the floor cross members 32 and the join portion 84 of the corresponding floor cross extension 82 that is joined to the upper face portion 38 are each formed with a planar shape along the horizontal direction. However, depending on the vehicle type, the join portion 84 does not necessarily have to be formed with a planar shape along the horizontal direction.

Although the outer section 40 and the inner section 42 are formed integrally to each other in each of the rockers 14 in the present exemplary embodiment, there is no limitation thereto. For example, the outer section 40 and the inner section 42 may be individually formed as separate members and then joined together.

Although the width dimension of the rocker lower section 76 is set so as to be greater than the width dimension of the rocker upper section 74 in the rockers 14 of the present exemplary embodiment, there is no limitation thereto. For example, the width dimension of the rocker lower section 76 and the width dimension of the rocker upper section 74 may be set so as to be substantially the same in the rockers 14.

In the present exemplary embodiment, the ladder shaped upper-side energy absorbing section 78 is formed inside the rocker upper section 74 and the ladder shaped lower-side energy absorbing section 80 is formed inside the rocker lower section 76. However, the shapes of the upper-side energy absorbing section 78 and the lower-side energy absorbing section 80 are not limited thereto, and the upper-side energy absorbing section 78 and the lower-side energy absorbing section 80 may have different shapes.

The upper-side energy absorbing section 78 and the lower-side energy absorbing section 80 do not necessarily both have to be provided inside the rockers 14. Depending on the load transmission paths, a configuration may be applied in which either one of the upper-side energy absorbing section 78 or the lower-side energy absorbing section 80 is not formed.

Although the upper-side energy absorbing section 78 and the lower-side energy absorbing section 80 are integrally formed in each of the rockers 14, the upper-side energy absorbing section 78 and the lower-side energy absorbing section 80 may be formed as separate bodies to the rockers 14. In cases in which the upper-side energy absorbing section 78 and the lower-side energy absorbing section 80 are formed of a different material to the rockers 14, the degrees of freedom for design regarding the mechanical strength of the rockers 14 are increased.

Although an example of an exemplary embodiment of the present disclosure has been explained above, exemplary embodiments of the present disclosure are not limited to the above description, and exemplary embodiments and various modified examples may be combined as appropriate. Obviously various configurations may be implemented within a range not departing from the spirit of the present disclosure.

What is claimed is:

1. A vehicle body side section structure comprising:
    a rocker that is installed at a vehicle width direction outer side of a floor panel of a vehicle and that extends along a vehicle front-rear direction, the rocker includes an outer section positioned at the vehicle width direction outer side and an inner section positioned at a vehicle width direction inner side of the outer section and that forms a closed cross-section together with the outer section;
    a floor cross member that is installed along a vehicle width direction above the floor panel so as so to form a gap between the floor cross member and the rocker, and that has a length direction along the vehicle width direction;
    a battery pack that is installed at a vehicle lower side of the floor panel so as to be further toward an inner side than two length direction ends of the floor cross member in plan view; and
    a floor cross extension that connects the rocker and the floor cross member together in the vehicle width direction, and that is set so as to undergo plastic deformation prior to the floor cross member in a side collision of the vehicle,
    wherein an upper energy absorbing section is provided inside a rocker upper section configuring an upper section of the rocker so as to span in the vehicle width direction between the outer section and the inner section at a position overlapping with the floor cross member in the vehicle side view, and
    wherein a yielding portion that is bent toward a vehicle vertical direction is formed at the floor cross extension at a rocker side within the gap.

2. The vehicle body side section structure of claim 1, wherein a reinforcement that reinforces the battery pack is provided at the vehicle width direction outer side of the battery pack at a position overlapping with the rocker in a vehicle side view.

3. The vehicle body side section structure of claim 1, wherein:
    the floor cross member includes an upper face portion that configures an upper portion of the floor cross member and that is formed with a planar shape along a horizontal direction; and
    the floor cross extension includes a join portion that configures one vehicle width direction end portion of the floor cross extension, that is formed with a planar shape along the horizontal direction, and that is joined to the upper face portion of the floor cross member.

4. The vehicle body side section structure of claim 1, wherein the rocker includes:
    a lower energy absorbing section that spans in the vehicle width direction between the outer section and the inner section inside the closed cross-section,
    wherein a reinforcing portion that configures part of a reinforcement to reinforce the battery pack is provided between the battery pack and the rocker at a position overlapping with the lower energy absorbing section in a vehicle side view.

5. The vehicle body side section structure of claim 1, wherein a rocker lower section configuring a lower section of the rocker is set so as to have a greater width dimension along the vehicle width direction than the rocker upper section configuring the upper section of the rocker.

6. The vehicle body side section structure of claim 1, wherein the rocker includes:
    a lower energy absorbing section that spans in the vehicle width direction between the outer section and the inner section inside the closed cross-section, wherein:
    a reinforcing portion that configures part of a reinforcement to reinforce the battery pack is provided between the battery pack and the rocker at a position overlapping with the lower energy absorbing section in a vehicle side view, and the lower energy absorbing section includes a first upper wall portion that extends substantially along a horizontal direction, a first lower wall portion that faces the first upper wall portion and that extends substantially along the horizontal direction, and a plurality of first coupling walls that span in a vehicle vertical direction between the first upper wall portion and the first lower wall portion and that are arranged along the vehicle width direction.

7. The vehicle body side section structure of claim 6, wherein:
the upper energy absorbing section includes a second upper wall portion that extends substantially along the horizontal direction, a second lower wall portion that faces the second upper wall portion and that extends substantially along the horizontal direction, and a plurality of second coupling walls that span in the vehicle vertical direction between the second upper wall portion and the second lower wall portion and that are arranged along the vehicle width direction.

8. The vehicle body side section structure of claim 7, wherein a plate thickness of each of the plurality of second coupling walls of the upper energy absorbing section is thicker than a plate thickness of each of the plurality of first coupling walls of the lower energy absorbing section.

9. The vehicle body side section structure of claim 1, wherein:
the battery pack includes a battery case formed in a box shape having a length direction along the vehicle front-rear direction and being flattened in a vehicle vertical direction, a plurality of battery modules housed in an inner section of the battery case, and a tray that supports the battery case from the vehicle lower side; and
the tray includes a linking flange that juts out toward the rocker and that is linked to the rocker.

10. The vehicle body side section structure of claim 9, wherein:
a reinforcement that reinforces the battery pack is provided at the vehicle width direction outer side of the battery pack at a position overlapping with the rocker in a vehicle side view; and
the reinforcement includes a joining tab that extends from a lower end of the reinforcement toward a lower side and that is joined to the tray.

11. A vehicle body side section structure comprising:
a rocker that is installed at a vehicle width direction outer side of a floor panel of a vehicle and that extends along a vehicle front-rear direction, wherein the rocker includes:
an outer section that is positioned at the vehicle width direction outer side;
an inner section that is positioned at a vehicle width direction inner side of the outer section and that forms a closed cross-section together with the outer section; and
a first energy absorbing section that spans in the vehicle width direction between the outer section and the inner section inside the closed cross-section, the first energy absorbing section includes a first upper wall portion that extends substantially along a horizontal direction, a first lower wall portion that faces the first upper wall portion and that extends substantially along the horizontal direction, and a plurality of first coupling walls that span in a vehicle vertical direction between the first upper wall portion and the first lower wall portion and that are arranged along the vehicle width direction,
a floor cross member that is installed along a vehicle width direction above the floor panel so as so to form a gap between the floor cross member and the rocker, and that has a length direction along the vehicle width direction;
a battery pack that is installed at a vehicle lower side of the floor panel so as to be further toward an inner side than two length direction ends of the floor cross member in plan view;
a floor cross extension that connects the rocker and the floor cross member together in the vehicle width direction, and that is set so as to undergo plastic deformation prior to the floor cross member in a side collision of the vehicle;
a reinforcing portion that configures part of a reinforcement to reinforce the battery pack provided between the battery pack and the rocker at a position overlapping with the first energy absorbing section in a vehicle side view,
wherein a second energy absorbing section is disposed inside a rocker upper section configuring an upper section of the rocker so as to span in the vehicle width direction between the outer section and the inner section at a position overlapping with the floor cross member in the vehicle side view, the second energy absorbing section includes a second upper wall portion that extends substantially along the horizontal direction, a second lower wall portion that faces the second upper wall portion and that extends substantially along the horizontal direction, and a plurality of second coupling walls that span in the vehicle vertical direction between the second upper wall portion and the second lower wall portion and that are arranged along the vehicle width direction,
wherein a plate thickness of each of the plurality of second coupling walls of the second energy absorbing section is thicker than a plate thickness of each of the plurality of first coupling walls of the first energy absorbing section.

12. The vehicle body side section structure of claim 11, wherein a yielding portion that is bent toward a vehicle vertical direction is formed at the floor cross extension at a rocker side within the gap.

13. The vehicle body side section structure of claim 11, wherein:
the floor cross member includes an upper face portion that configures an upper portion of the floor cross member and that is formed with a planar shape along a horizontal direction; and
the floor cross extension includes a join portion that configures one vehicle width direction end portion of the floor cross extension, that is formed with a planar shape along the horizontal direction, and that is joined to the upper face portion of the floor cross member.

14. The vehicle body side section structure of claim 11, wherein a rocker lower section configuring a lower section of the rocker is set so as to have a greater width dimension along the vehicle width direction than the rocker upper section configuring the upper section of the rocker.

* * * * *